Patented Jan. 7, 1930

1,742,358

UNITED STATES PATENT OFFICE

GEORG KRÄNZLEIN AND HEINRICH VOLLMANN, OF HOCHST-ON-THE-MAIN, GERMANY, ASSIGNORS TO GENERAL ANILINE WORKS, INC., OF NEW YORK, N. Y., A CORPORATION OF DELAWARE

CONDENSATION PRODUCT OF THE BENZO-PYRENE-QUINONE SERIES AND PROCESS OF PREPARING THE SAME

No Drawing. Application filed May 7, 1926, Serial No. 107,485, and in Germany May 11, 1925.

This invention relates to a process of preparing condensation products of the anthraquinone series and to the products produced thereby. More specifically the invention relates to the production of products of the benzo-pyrene-quinone series.

German Patent 412,053 describes the production of dibenzo-pyrene-quinone dyestuffs by the action of aromatic acidhalogenides on benzanthrones. The mechanism of the reaction is explained as consisting of a closing of the ring following the formation of aroylbenzanthrones. This supposition was confirmed in Germain patent specification No. 420,412 according to which the aroylbenzanthrones were converted into dibenzo-pyrene-quinones by means of aluminium chloride condensation.

It has now been found that in a surprising way the aroylbenzanthrones of the general formula:

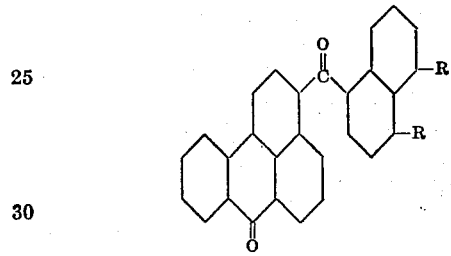

wherein each R stands for hydrogen or both R's together stand for the bivalent radical $H_2C—CH_2$, on alkaline condensation yield very smoothly bodies of the benzo-pyrenequinone series. This fact was not at all to be foreseen since judging from German Patent No. 407,838 it would have to be assumed that aroyl-2.2'-dibenzanthronyls result. If the aroyl-residue is a noncondensed ring system as for instance —CO—$C_6H_5$ or —CO—$C_6H_4.C_6H_5$ neither aroyl-2.2'dibenzanthronyls nor benzo-pyrene-quinones are produced on alkaline condensation, but dyestuffs of the violanthrene series, the aroyl residue being split off.

The ring-closing of the aroylbenzanthrones of the general formula given above by alkaline condensation, which leads to the formation of bodies of the benzo-pyrene-quinone series extremely smoothly, is of great commercial importance since in this manner bodies of the benzo-pyrene-quinone class are made accessible, which heretofore have not been capable of production at all. An example is benzo-naphtho-pyrene-quinone, which results by the fusion of α-naphthoylbenzanthrone with potassium hydroxide.

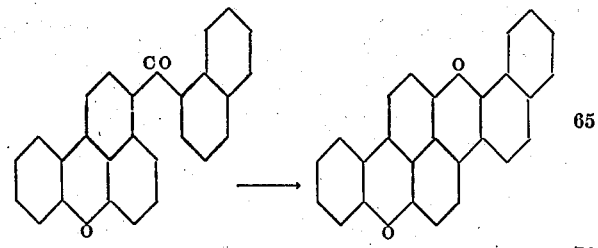

The invention is illustrated by the following examples but it is to be understood that the invention is not limited to the specific products mentioned in these examples.

1. 1 part by weight of bz-1-α-naphthoylbenzanthrone is stirred with 4 parts by weight of powdered potassium hydroxide and 3 parts by volume of alcohol. It is heated next for a quarter of an hour at 100° C., whereupon a green melt is obtained. Then the temperature is raised for a short time up to 230° C. with vaporization of the alcohol. After it has cooled down, the mass is diluted with hot water, the dyestuff formed is vatted by the addition of hydrosulfite and the vat is sucked off. The dyestuff is obtained by blowing out with air in the form of pure orange-brown flakes. The color of its solution in concentrated sulfuric acid is clear dark blue. Its vat is carmine-red with a strong brown-orange colored bloom and dyes cotton brown-orange after ageing.

The benz-1-α-naphthoylbenzanthrone can be obtained by condensing bz-1-benzanthron-carboxylic acid chloride and naphthalene by means of aluminium chloride. From pyridine it crystallizes as a bright yellow substance melting at 244–245°. The color of its solution in concentrated sulfuric acid is cherry red.

2. 1 part by weight of 4-acenaphthyl-bz-1-benzanthronyl ketone is rubbed with alcohol to a thick paste and this is introduced into 5 parts by weight of fused potassium hydroxide at about 150° C. The temperature is gradually raised up to 230° C. The working up is carried out as described in Example 1. The resulting dyestuff possesses the following constitution:

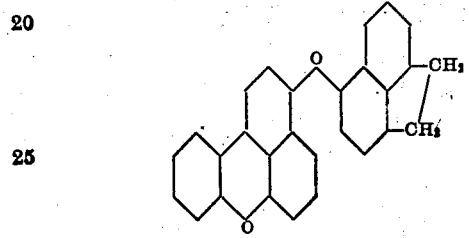

Its own color and its dyeing on cotton is rust-brown. The vat is bluish-red. The color of its solution in concentrated sulfuric acid is blue.

The acenaphthyl-bz-1-benzanthronyl ketone (4-acenaphthoyl-bz-1-benzanthrone) can be obtained by condensing bz-1-benzanthron-carboxylic acid chloride and acenaphthene by means of aluminium chloride. It crystallizes from glacial acetic acid or xylol in yellow needles melting at 270° C. Its solution in concentrated sulfuric acid is red with olive green fluorescence.

We claim:

1. The process of preparing condensation products of the benzo-pyrene-quinone series which comprises fusing with potassium hydroxide an aroylbenzanthrone of the general formula:

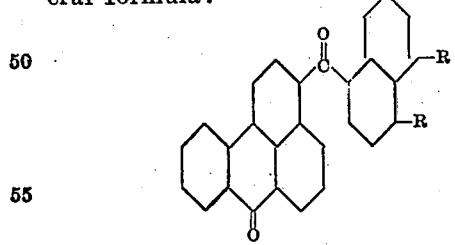

wherein each R stands for hydrogen or both R's together stand for the bivalent radical H₂C—CH₂.

2. The process of preparing condensation products of the benzo-pyrene-quinone series which comprises heating with potassium hydroxide to a temperature above about 100° C. an aroylbenzanthrone of the general formula:

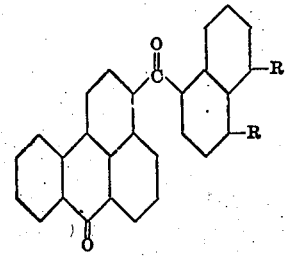

wherein each R stands for hydrogen or both R's together stand for the bivalent radical H₂C—CH₂.

3. The process of preparing condensation products of the benzo-pyrene-quinone series which comprises heating with potassium hydroxide to a temperature between about 100–230° C. an aroylbenzanthrone of the general formula:

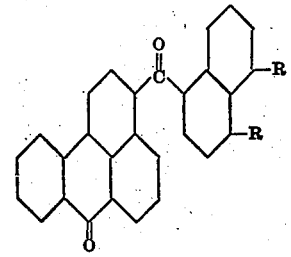

wherein each R stands for hydrogen or both R's together stand for the bivalent radical H₂C—CH₂.

4. The process of preparing benzo-naphtho-pyrene-quinone which comprises fusing Bz-1-α-naphthoylbenzanthrone with potassium hydroxide.

5. The process of preparing benzo-naphtho-pyrene-quinone which comprises heating Bz-1-α-naphthoylbenzanthrone with potassium hydroxide to a temperature above about 100° C.

6. The process of preparing benzo-naphtho-pyrene-quinone which comprises heating Bz-1-α-naphthoylbenzanthrone with potassium hydroxide to a temperature between about 100–230° C.

7. As new products the condensation products of the benzo-pyrene-quinone series having probably the general formula:

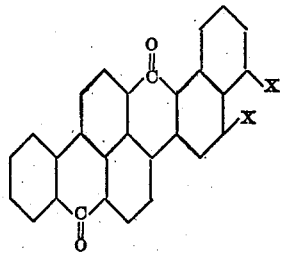

wherein the X's stand for hydrogen atoms or stand for CH₂ groups which are linked together by a single bond, which products are in a dry state orange-brown to rust-brown powders, soluble in concentrated sulfuric acid with a blue color, and dye cotton from a carmine-red to a bluish-red vat orange-brown to rust-brown shades.

8. As a new product the benzo-naphtho-pyrene-quinone of the following formula:

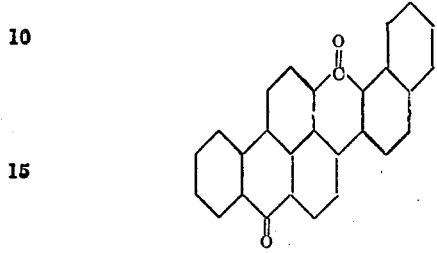

which product is in the dry state an orange-brown powder, soluble in concentrated sulfuric acid with a dark blue color and dyes cotton from a carmine-red vat orange-brown shades.

In testimony whereof, we affix our signatures.

GEORG KRÄNZLEIN.
HEINRICH VOLLMANN.